United States Patent Office 2,925,395
Patented Feb. 16, 1960

2,925,395
METHOD OF PREPARING PLATINUM-ALUMINA CATALYST

Roy W. Vander Haar, Highland, Ind., assignor to Standard Oil Company, Chicago, Ill., a corporation of Indiana No Drawing. Application July 8, 1957
Serial No. 670,357

6 Claims. (Cl. 252—466)

This invention relates to the conversion of hydrocarbons and to an improved catalyst therefor. More particularly, it relates to an improvement in a method of preparing alumina-supported platinum catalyst and to the catalytic hydroforming a petroleum naphthas therewith.

The use of platinum-group metal catalysts is now well-established in the art, where they have been employed for many diverse processes, such as the hydrogenation of carbonyl groups and unsaturated carbon-carbon linkages, dehydrogenation of naphthenes, oxidation of sulfur dioxide, and the like. An especially successful development of recent years has been the use of platinum-alumina catalysts for hydroforming petroleum naphthas, whereby gasoline products are obtained having greatly improved antiknock ratings. An object of my invention is to produce an alumina-supported catalyst of improved activity. Another object is to reduce the number of drying steps required in the preparation of a highly-active platinum-alumina catalyst. These and other objects of my invention will be apparent from the following description thereof.

I have earlier discovered, in collaboration with Harry M. Brennan and Edmund Field, a new form of alumina, having improved properties as a support for platinum catalysts, prepared by "alkali-aging" petized alumina at a pH between about 8.5 and 12 so as to form a filterable slurry of solid hydrous alumina, and thereafter drying to a volatiles content less than about 50 percent, wet basis, prior to incorporation of platinum therein. This technique is applicable broadly to alumina hydrosols or other forms of hydrous alumina which have been subjected to some degree of peptization (i.e., conversion to the colloidal alumina form) by treatment with a weak acid.

I have now discovered an improvement in the said "alkali-aging" technique, as applied to alumina hydrosols of the Heard-type as hereinafter described, which improvement comprises the additional step, prior to drying thereof, of repeatedly reslurrying the solid, hydrous alumina with aqueous ammonia solution having a pH of at least about 9. My reslurrying step substantially improves the activity of the final catalyst. In addition, the improved activity as a result of my step more than off-sets any loss in activity which may result from omissive of the preplatinizing drying step, if desired. Omission of this drying step substantially simplifies and decreases the cost of manufacturing the catalyst.

By "repeatedly reslurrying" is meant vigorously agitating the solid, hydrous alumina with the treating solution, i.e., aqueous ammonia with a pH in the range of about 9 to 11, preferably about 10, at least twice, and preferably 3 to 5 times, for a period of about one minute to about 1 hour, preferably 2 to 10 minutes, at ordinary temperatures or higher. The agitation should, at a minimum, be sufficient to break up any lumps of solid, hydrous alumina. Between each reslurrying, the alumina is separated, e.g., by filtration and/or centrifugation. Mere washing of the solid, hydrous alumina with a treating solution is inadequate. Thus, for example, immersing a filter cake of the solid, hydrous alumina in aqueous ammonia solution of the required pH does not bring about the desired results.

By "Heard-type alumina hydrosol," to which my invention is specifically directed, I mean hydrosols prepared by the technique described in Heard Re. 22,196 (October 6, 1942). According to this technique, aluminum metal in the form of sheets, granules, turnings, sawdust, chips, shot, rings, irregular shapes, or the like, is subjected to amalgamation by contact with mercury or an aqueous solution of a mercury salt. The amalgamated aluminum is then digested in water in the presence of a low concentration (suitably around 2 percent by weight) of acetic acid or other weak organic acid as a peptizing agent. The reaction goes forward readily at ordinary or autogenous pressures and at temperatures above about 100° F., preferably between about 125 and 160° F. Thick, viscous hydrosols can be obtained at temperatures above about 160° F., while relatively thin hydrosols, which are preferred, are obtained at temperatures below about 160° F. The mixture of amalgamated aluminum and acidulated water is preferably agitated in order to improve the contact of the reacting materials and to assist in breaking the layer of froth which is ordinarily formed by the hydrogen liberated in the reaction. A reflux condenser is advantageously employed to condense water and acid vapors from the emerging hydrogen stream and to return the resulting condensate to the reaction vessel. The reaction gradually slows down after about 24 hours and ordinarily ceases for all practical purposes after about 30 hours. The reaction product is thereafter clarified by settling, centrifugation, filtration, or the like, to remove any suspended solids, including particles of metallic mercury. The hydrosol product is a syrupy liquid of opalescent, nearly transparent appearance, containing from around 2 to 10 percent by weight of $Al_2O_3$.

In one embodiment of my invention, a Heard-type alumina hydrosol is agitated and commingled with an alkaline substance, preferably ammonia or ammonium hydroxide, in a quantity sufficient to raise the pH above about 8.5, but insufficient to convert any considerable proportion of the alumina into an aluminate salt. Ordinarily a pH no higher than the maximum level obtainable by adding ammonia to the system under pressure (i.e., below about pH 12) is used, and preferably in the range of about pH 10 to 11. The alkalined hydrosol is aged at about 50 to 250° F., preferably at ordinary temperatures around 70 to 100° F., until the alumina has been converted into a filterable slurry of a white, finely-divided solid, the reaction being ordinarily complete in as little as one hour at pH 9.5 or above, whereas a day may be required at pH 9, and 2 to 3 days at pH 8.5. The slurry thus obtained is filtered to separate the hydrous alumina, suitably at an elevated temperature between about 150 and 200° F. in order to ensure a rapid filtration rate. The alumina is thereafter reslurried with alkali, and the aging is continued under conditions of pH and temperature within the range set forth hereinabove. The aging is continued for an hour or more, preferably in excess of 24 hours, and optimally between about 2 and 7 days. The slurry is again filtered, and, in accordance with my invention, the filter cake is then repeatedly reslurried with aqueous ammonium hydroxide having a pH of about 9 to 11 for about 2 to 10 minutes, and the final filter cake is dried at ordinary or elevated temperatures up to about 1200° F., preferably between about 150 and 400° F. to a voltatiles content less than about 50 percent, wet basis, optimally between about 15 and 40 percent.

The dried cake is impregnated with a platinum-containing solution according to any of the techniques of the prior art to a platinum level between about 0.05 and 1 percent by weight, based on dry $Al_2O_3$. For this purpose, we find it especially advantageous to employ an aqueous chloro-platinic acid solution in a quantity just sufficient to saturate the alumina powder, and to adjust the concentration of platinum in the solution to produce a completed catalyst of the desired platinum content. (Optionally, the platinum-containing solution may contain a water-soluble, inorganic aluminum salt, preferably aluminum nitrate or chloride in a molar ratio of aluminum salt to alumina between about 0.001:1. In such case the alumina should previously have been subjected to calcination, e.g., 800 to 1200° F. for 2 to 24 hours.) Thereafter, an ammonium sulfide solution is added in an S:Pt atomic ratio between about 1 and 10 to effect uniform distribution of the platinum in and on the alumina. The impregnated alumina is again dried, preferably below 250° F., pelleted if desired, and finally calcined in air, hydrogen, or an inert gas such as nitrogen or flue gas at 800 to 1200° F., preferably 1000 to 1200° F., for around 3 to 24 hours before being placed on stream in a catalytic process.

Ammonia or ammonium hydroxide is a highly advantageous material for use as the alkalizing agent. Other nitrogen bases can also be employed for this purpose, including water-soluble amines such as methylamine, dimethylamine, trimethylamine, ethylamines, isopropylamine, diisopropylamine, and furfurylamine, quaternary ammonium hydroxides such as tetramethylammonium hydroxide and benzyltrimethyl-ammonium hydroxide, and the like. In all cases, the alkalizing agent must have an ionization constant sufficiently high to permit it to raise the peptized alumina mixture to a pH above about 8.5, and must be used in a sufficient quantity to reach the desired pH level, but insufficient to convert any considerable quantity of the alumina into aluminate salts. On this basis, a pH of around 11.5 is the practical maximum and can be produced, for example, by adding about two volumes of aqueous 29 percent ammonium hydroxide to one volume of Heard-type alumina hydrosol.

As previously pointed out, the improved activity resulting from my reslurrying step may permit the immediate impregnation of the reslurried solid, hydrous alumina with a platinum impregnating solution without requiring a costly preplatinizing drying step. Activity of the resulting catalyst is at least equivalent to that without my reslurrying step but with the drying step. For maximum activity, however, drying of the catalyst prior to platinum impregnation is preferred.

When preplatinizing drying is used, experience has shown that it is sufficient to dry the alumina to a volatiles content below about 50 percent by weight, wet basis, prior to platinum impregnation, the alumina being converted thereby into a precursor of eta alumina. The drying is suitably carried out at ordinary or elevated temperatures up to about 400° F., preferably between about 150 and 400° F., and preferably to a volatiles content between about 15 and 40 percent. A drying time of about 1 to 24 hours is ordinarily sufficient, and under favorable conditions a near approach to the equilibrium volatiles content at most temperatures can be achieved in around 5 hours on the average. The approximate equilibrium or near-equilibrium volatiles content of the alumina cake at a series of drying temperatures is set forth in the following table:

| Drying Temperature, ° F. | Ratio, $H_2O:Al_2O_3$, molar | Volatiles Content, wet basis, wt.-percent |
|---|---|---|
| 220 | 3 | 34.6 |
| 300 | 2.8 | 33.1 |
| 400 | 1 | 15 |

The resulting dried cake, unlike most aluminas known to the prior art, can be pelleted immediately if desired, without a preliminary calcination at high temperature, requiring only pulverization and the addition of a lubricant of the usual sort, such as 4 percent of Sterotex. The dried alumina, before or after being pelleted, but preferably after being impregnated with platinum, is readily converted wholly or in part into eta alumina by the simple device of further drying at higher temperatures, suitably between about 500 and 1200° F. for a period of 1 to 24 hours or more, and preferably between about 800 and 1200° F. for a period of around 6 to 12 hours. Where the dried alumina has been subjected to pelleting before being converted to eta alumina, the said conversion is preferably carried out at 1000 to 1200° F. in order to produce completed pellets of highest mechanical strength. The completed alumina contains a substantial proportion of eta alumina, ordinarily 5 percent or more, as indicated by the X-ray diffraction pattern thereof, and may contain approaching 100 percent eta alumina, depending upon the duration, pH, and temperature of the aging period, and the duration and temperature of the heating periods.

It will be apparent that a preliminary drying to form eta alumina precursor and a further heat treatment to form eta alumina may be carried out in an uninterrupted operation if desired at progressively rising temperature, although platinum impregnation between the two stages is preferred. Alternatively, the entire drying and heat-treating operation may be carried out in a treating zone nominally maintained at a temperature within the range required for the production of eta alumina (i.e., from about 500 to 1200° F.). In this modification, the preliminary drying is carried out rapidly at rising temperature during evolution of the volatiles, and the period of conversion to eta alumina follows immediately without interruption.

The catalyst can be prepared in any of the usual mechanical forms. It can be ground to a powder for use in fluidized form. It can be broken into irregular fragments. It can be prepared in various shapes, such as pills, pellets, rings, rosettes, saddles, and the like as desired. In the preparation of shaped catalysts, as pointed out hereinabove the alumina base does not require a preliminary calcination; instead, the dried cake can be pulverized, mixed with a lubricant, and formed directly into shapes; and only thereafter is calcination employed to effect formation of eta alumina and to set and strengthen the mechanical structure of the shaped material. In most cases, the final conditioning of the catalyst composition, whether pelleted or not, is carried out by calcination in air, hydrogen, or an inert gas at about 1000 to 1200° F. for around 3 to 24 hours before being placed on stream.

"Eta alumina," as the term is employed herein, refers to a form of alumina of the type described by Allen S. Russell et al. in their brochure entitled "Alumina Properties," Technical Paper No. 10, revised copyright 1956, Aluminum Company of America. In one prior-art method for the preparation of eta alumina, beta-alumina trihydrate is dried at 284 to 842° F. The resulting composition is largely eta alumina, which closely resembles gamma-alumina and is distinguishable therefrom in physical properties only by slight differences in their X-ray diffraction patterns (Stumpf, Russell, Newsome, and Tucker, Ind. Eng. Chem., 42 (1950), 1398–1403). Moreover, it is commonly found that such compositions contain a substantial proportion of gamma alumina, which, however, is without adverse catalytic effects. The alumina produced by the present invention contains 5 percent or more of eta alumina, but differs from such prior-art eta alumina compositions in some unascertained way, as a result of which it affords platinum-alumina catalysts of strikingly superior activity.

The following specific example will more clearly illustrate the technique and advantages of my invention.

*Example*

A Heard-type alumina hydrosol was prepared by reacting metallic aluminum pellets with water in the presence of mercuric oxide and dilute acetic acid. The resulting alumina hydrosol contained 5.34 percent $Al_2O_3$. Two portions of the alumina hydrosol, each weighing 2820 grams, were each mixed with 400 milliliters of concentrated (29 percent) $NH_3$ solution, thereby raising the pH to about 10. In each case solid, hydrous alumina was precipitated in less than about 1 hour and was allowed to age in excess of 6 days to assure complete aging of the alumina. Both samples of alumina were then filtered.

In accordance with the practice of the prior art, one of the two identical samples was dried at 400° F. to a volatiles content of about 20 percent by weight, wet basis. The other sample, in accordance with my invention, was reslurried and agitated with aqueous $NH_3$ solution having a pH of about 10 for several minutes and was then refiltered. This reslurrying step was repeated twice more, after which the final filter cake was dried at 400° F. to the same volatiles content of 20 percent by weight, wet basis, as in the case of the first sample.

Both samples were then crushed and impregnated with identical aliquots of the same platinum solution in a quantity sufficient to raise the platinum level of a finished catalyst to about 0.6 weight percent. Both samples were then dried at the same time in the same oven, pelleted, and calcined at about 1000° F.

Both samples of the completed catalyst were subjected to a hydroforming test under standardized conditions, employing 50 milliliters of catalyst in a quasi-isothermal reaction zone surrounded by an electrically-heated block for temperature control. The tests were carried out at a catalyst outlet temperature of 920° F., a pressure of 200 pounds per square inch gage, an hourly weight space velocity of 2, and a once-through hydrogen rate of 5,000 standard cubic feet per barrel of feed. The feed was a Mid-Continent virgin naphtha having the following inspections:

| | |
|---|---|
| Gravity, °API | 55.8 |
| ASTM distillation, ° F.— | |
| Initial | 210 |
| 10% | 231 |
| 20% | 247 |
| 30% | 256 |
| 40% | 265 |
| 50% | 275 |
| 60% | 287 |
| 70% | 299 |
| 80% | 315 |
| 90% | 332 |
| E.P. | 389 |
| Sulfur, p.p.m. | 230 |
| Type analysis, vol. percent— | |
| Paraffins | 48.5 |
| Olefins | 0.0 |
| Naphthenes | 44.0 |
| Aromatics | 7.5 |

In each case the catalyst activity was calculated as the relative quantity, expressed as a percentage, of an arbitrarily-chosen reference catalyst, containing 0.6 percent platinum on alumina, required to produce a $C_{5+}$ product fraction having the same octane number from the same Mid-Continent virgin naphtha under the same test conditions. The results were as follows:

| Hours on Oil | Activity | |
|---|---|---|
| | Without Repeated Reslurrying Step | With Repeated Reslurrying Step |
| 10 | 180 | 220 |
| 30 | 159 | 184 |
| 50 | 155 | 187 |
| 70 | 139 | 165 |
| 90 | 137 | 158 |
| 110 | 130 | 149 |
| 130 | | 140 |

By means of my improvement in preparing catalysts from alkali-aged Heard-type alumina hydrosol, activity, as shown in the above comparison, is improved by about 18 percent. Such increased activity would raise ceiling octane levels in a given unit or would reduce catalyst requirements at the same octane level. In a 20,000 barrel-per-calendar-day hydroforming unit, using 0.6 weight percent platinum-on-alumina catalyst, such reduction in catalyst requirements would reduce the outlay for catalyst by over $300,000 at present price levels.

My improved catalyst is broadly useful in hydrocarbon-conversion reactions which are catalyzed by platinum. Specifically, my catalyst is useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art, as set forth above. My catalyst is especially advantageous in the hydroforming of petroleum naphthas boiling in the range of about 200–400° F., and is capable of upgrading a 50 percent naphthenic naphtha, having an unleaded CFR-R octane number of only 40 to 50, into a $C_{5+}$ gasoline having an octane number of 90 to 100 in a yield of 80 to 85 percent.

While I have described my invention with reference to certain specific embodiments thereof, it is to be understood that such embodiments are illustrative only and not by way of limitation. Numerous modifications and equivalents of our invention will be apparent from the foregoing description to those skilled in the art.

In accordance with the foregoing description, I claim:

1. A method for preparing an alumina-supported platinum catalyst which comprises adding an alkaline substance selected from the group consisting of ammonia, ammonium hydroxide, water-soluble amines, and mixtures thereof to a Heard-type alumina hydrosol in a sufficient quantity to raise the pH thereof to a level within the range of about 8.5 and 12, maintaining the resulting mixture at a pH within said range for a period in excess of about one hour, separating solid, hydrous alumina from the resulting slurry, repeatedly reslurrying said solid, hydrous alumina with aqueous ammonia solution having a pH at least about 9, again separating solid, hydrous alumina from the final slurry, impregnating the separated alumina with between about 0.05 and 1 percent by weight of platinum, based on dry $Al_2O_3$, and drying and calcining.

2. A method for preparing an alumina-supported platinum catalyst which comprises adding an alkaline substance selected from the group consisting of ammonia, ammonium hydroxide, water-soluble amines, and mixtures thereof to a Heard-type alumina hydrosol in a sufficient quantity to raise the pH thereof to a level within the range of about 8.5 and 12, maintaining the resulting mixture at a pH within said range for a period in excess of about one hour, separating solid, hydrous alumina from the resulting slurry, repeatedly reslurrying said solid, hydrous alumina with aqueous ammonium hydroxide having a pH in the range of about 9 to 11, again separating solid, hydrous alumina from the final slurry, drying the separated alumina to a volatiles content below about 50 percent by weight, wet basis, impregnating the dried alumina with between about 0.05 and 1 percent by weight of platinum, based on dry $Al_2O_3$, and drying and calcining.

3. A method for preparing an alumina-supported platinum catalyst of superior activity, which comprises commingling a Heard-type alumina hydrosol with a quantity of a water-soluble amine sufficient to raise the pH of the resulting mixture to a level within the range of about 8.5 to 12, maintaining the resulting mixture at a pH within said range and at a temperature between about 50 and 250° F. for a period in excess of about 60 hours, whereby a filterable slurry of solid, hydrous alumina is obtained, separating said solid, hydrous alumina from said slurry, repeatedly reslurrying said solid, hydrous alumina with aqueous ammonia solution having a pH in the range of about 9 to 11, again separating solid hydrous alumina from the final slurry, drying said solid, hydrous alumina to a volatiles content below about 50 percent by weight, wet basis, impregnating the dried alumina with an aqueous platinum solution to a platinum level between about 0.05 and 1 percent by weight, based on dry $Al_2O_3$, and drying and calcining.

4. A method for preparing a platinum-alumina catalyst of superior activity which comprises commingling a Heard-type alumina hydrosol with a quantity of aqueous ammonium hydroxide sufficient to raise the pH of the resulting mixture to a level within the range of about 8.5 to 12, maintaining the resulting mixture at a pH within said range and at a temperature between about 50 and 250° F. for a period in excess of about one hour, whereby a filterable slurry of solid, hydrous alumina is obtained, separating solid, hydrous alumina from said slurry, repeatedly reslurrying said solid, hydrous alumina with aqueous ammonia solution having a pH in the range of about 9 to 11, again separating solid, hydrous alumina from the final slurry, drying and calcining said solid, hydrous alumina at a temperature between about 800 and 1200° F. for a period of about 2 to 24 hours, impregnating the calcined alumina to a platinum level between about 0.05 and 1 percent by weight, based on dry $Al_2O_3$, employing a solution containing chloroplatinic acid and aluminum chloride in a molar ratio of aluminum chloride to alumina between about 0.001:1 as the impregnating medium, and drying and calcining.

5. In a method for preparing an alumina-supported platinum catalyst which comprises adding an alkaline substance selected from the group consisting of ammonia, ammonium hydroxide, water-soluble amines, and mixtures thereof to a Heard-type alumina hydrosol in a sufficient quantity to raise the pH thereof to a level within the range of about 8.5 and 12, maintaining the resulting mixture at a pH within said range for a period in excess of about one hour, separating solid, hydrous alumina from the resulting slurry, drying the separated alumina to a volatiles content below about 50 percent by weight, wet basis, impregnating the dried alumina with between about 0.05 and 1 percent by weight of platinum, based on dry $Al_2O_3$, and drying and calcining, the improvement which comprises repeatedly reslurrying said solid, hydrous alumina with aqueous ammonia solution having a pH in the range of about 9 to 11 after separating said solid, hydrous alumina from the resulting slurry and prior to drying said separated alumina.

6. A method for preparing an alumina-supported platinum catalyst which comprises adding an alkaline substance selected from the group consisting of ammonia, ammonium hydroxide, water-soluble amines, and mixtures thereof to an alumina hydrosol in a quantity sufficient to raise the pH thereof to a level within the range of about 8.5 to 12, maintaining the resulting mixture at a pH within said range until the alumina contained therein is converted into a filterable slurry of solid, hydrous alumina, separating the liquid phase at least in part from said slurry, further exposing said solid, hydrous alumina to contact with said alkaline substance at a pH between about 8.5 and 12 for a period in excess of about one hour, separating the solid, hydrous alumina, repeatedly reslurrying said solid, hydrous alumina with aqueous ammonium hydroxide having a pH in the range of about 9 to 11, drying the treated alumina to a volatiles content below about 50 percent by weight, wet basis, impregnating the dried alumina with an aqueous platinum solution to a platinum level between about 0.05 and 1 percent by weight, based on dry $Al_2O_3$, and drying and calcining.

References Cited in the file of this patent

UNITED STATES PATENTS

| Re. 22,196 | Heard | Oct. 6, 1942 |
| 2,663,620 | Haensel | Dec. 22, 1953 |
| 2,814,599 | Lefrancois | Nov. 26, 1957 |